(12) United States Patent
Wember

(10) Patent No.: US 8,376,921 B2
(45) Date of Patent: Feb. 19, 2013

(54) MACHINE TOOL

(75) Inventor: Dirk Wember, Rottweil (DE)

(73) Assignee: Haas Schleifmaschinen GmbH, Trossingen (DE)

( * ) Notice: Subject to any disclaimer, the term of this patent is extended or adjusted under 35 U.S.C. 154(b) by 1064 days.

(21) Appl. No.: 12/320,332

(22) Filed: Jan. 23, 2009

(65) Prior Publication Data

US 2009/0191017 A1   Jul. 30, 2009

(30) Foreign Application Priority Data

Jan. 24, 2008  (DE) .......................... 10 2008 005 937

(51) Int. Cl.
  *B23Q 3/157*  (2006.01)
  *B23Q 3/155*  (2006.01)

(52) U.S. Cl. ................ 483/18; 483/16; 483/19; 483/54; 483/55; 483/56; 483/58; 483/63; 483/67; 211/1.53; 211/1.55; 211/70.6

(58) Field of Classification Search .................... 483/14, 483/16, 18, 19, 33, 54, 55, 56, 57, 58, 63, 483/64, 66, 67; 211/1.55, 1.53, 1.52, 69, 211/70.6; 29/564, 564.1, 564.6, 564.7, 33 K, 29/26 A, 26 R
See application file for complete search history.

(56) References Cited

U.S. PATENT DOCUMENTS

| | | | | |
|---|---|---|---|---|
| 3,300,856 A | * | 1/1967 | Daugherty | 483/40 |
| 3,526,033 A | * | 9/1970 | Saunders | 483/54 |
| 3,868,763 A | * | 3/1975 | Sato | 483/8 |
| 3,966,052 A | * | 6/1976 | Knaus | 211/70.6 |
| 4,087,901 A | * | 5/1978 | Lohneis et al. | 483/8 |
| 4,119,213 A | * | 10/1978 | Sato et al. | 483/61 |
| 4,122,598 A | * | 10/1978 | Pegler et al. | 483/54 |
| 4,304,040 A | * | 12/1981 | Staiger et al. | 483/54 |
| 4,344,221 A | * | 8/1982 | Pagani | 483/8 |
| 4,394,908 A | | 7/1983 | Pinchemaille | |
| 4,557,035 A | * | 12/1985 | Rutschle et al. | 483/47 |
| 4,590,662 A | * | 5/1986 | Norota | 483/64 |
| 5,300,006 A | * | 4/1994 | Tanaka et al. | 483/56 |
| 5,364,329 A | * | 11/1994 | Line | 483/56 |
| 5,762,594 A | * | 6/1998 | Hoppe | 483/56 |

(Continued)

FOREIGN PATENT DOCUMENTS

| | | |
|---|---|---|
| DE | 43 42 630 A1 | 6/1994 |
| DE | 10 2006 011 551 A1 | 9/2007 |

(Continued)

*Primary Examiner* — Essama Omgba
(74) *Attorney, Agent, or Firm* — Nath, Goldberg & Meyer; Jerald L. Meyer; Scott C. Langford

(57) ABSTRACT

A machine tool comprising a tool spindle and a workpiece clamping mechanism moveable relative to one another on a linear X-axis in a controlled manner, wherein the tool spindle can be moved in a controlled manner in relation to a machine frame on Y and Z-axes which are perpendicular to the X-axis and to each other and can be pivoted in a controlled manner around a C-axis parallel to the Z-axis, and wherein a workpiece gripper, which can be moved in common with the tool spindle, is assigned to the tool spindle, and that the tool spindle can travel with the workpiece gripper to a magazine wheel on the Y, Z and C-axes and can be aligned with recesses on the magazine wheel, movement on the X, Y, Z and C-axes effecting transfer of a workpiece between the workpiece gripper and the workpiece clamping mechanism.

11 Claims, 12 Drawing Sheets

U.S. PATENT DOCUMENTS

| | | | | |
|---|---|---|---|---|
| 6,228,006 B1 * | 5/2001 | Horn et al. | | 483/55 |
| 7,462,144 B2 * | 12/2008 | Braun | | 483/56 |
| 7,462,145 B2 * | 12/2008 | Bader et al. | | 483/63 |
| 7,476,190 B2 * | 1/2009 | Braun | | 483/67 |
| 2008/0039305 A1 * | 2/2008 | Bader et al. | | 483/23 |
| 2008/0039307 A1 * | 2/2008 | Braun | | 483/55 |
| 2008/0207417 A1 * | 8/2008 | Braun | | 483/56 |

FOREIGN PATENT DOCUMENTS

| | | |
|---|---|---|
| EP | 0 941 790 A1 | 9/1999 |
| GB | 2 112 365 A | 7/1983 |

* cited by examiner

Figur 10

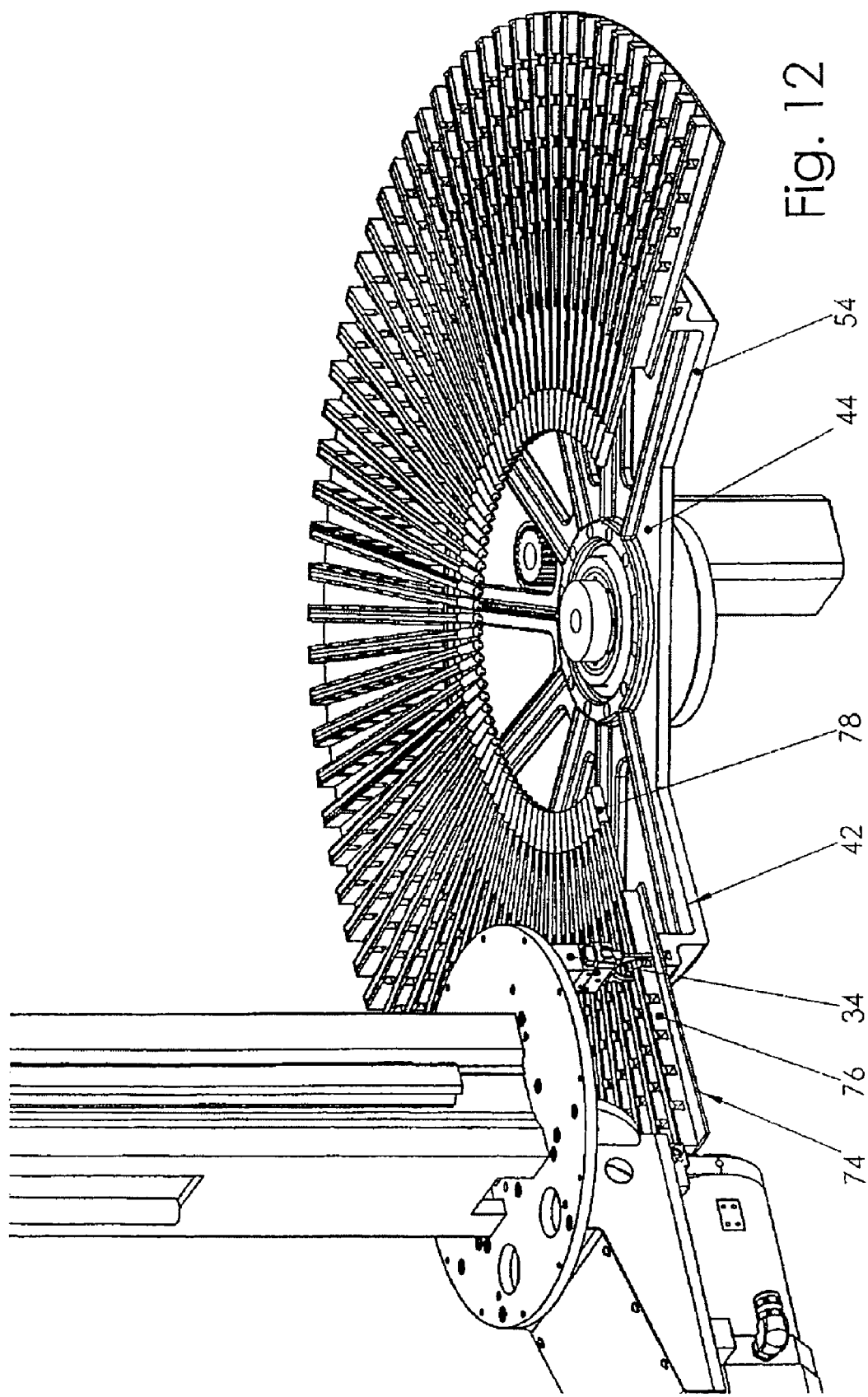

MACHINE TOOL

BACKGROUND

1. Technical Field

The subject matter relates to a machine tool comprising a machine frame, a tool spindle that can be driven so as to rotate, a workpiece clamping mechanism and a magazine, wherein the tool spindle and the workpiece clamping mechanism can be moved relative to one another on a linear X-axis in a controlled manner, and wherein the tool spindle can be moved in a controlled manner in relation to machine frame on Y-and Z-axes which are perpendicular to the X-axis and to each other and can be pivoted in a controlled manner around a C-axis parallel to the Z-axis.

Machine tools of this type, in which the tool spindle can be driven so as to rotate, are used in particular as grinding and/or milling machines. In these machine tools, the rotating tool, especially the grinding tool or milling cutter, and the workpiece to be machined are moved relative to each other in the so-called X-axis, wherein the workpiece can, if necessary, be rotated and positioned around an A-axis parallel to the X axis. The tool spindle is moved in a linear direction along Y-and Z axes, which are perpendicular to the X-axis and to each other, in order to control feed and machining motions. Furthermore, the work spindle can be pivoted at least around a C-axis parallel to the Z-axis in order to adjust the setting angle of the tool relative to the X-axis of the workpiece to be machined.

2. Description of Related Art

A machine tool of this kind is known, for example, from DE 10 2006 011 551 A1.

Another machine tool, in which the work spindle can be moved in the three mutually perpendicular, linear X-, Y- and Z-axes, is known from DE 197 08 096 A1. A magazine wheel, which can be positioned so as to rotate around a rotational axis, has recesses for tools on its circumference. The tool spindle can be driven to the magazine wheel in order to exchange tools between the recesses of the magazine wheel and the tool spindle. It is possible to arrange other workpiece holders on the magazine wheel so as to rotate around the same rotational axis in common with the magazine wheel, wherein the workpieces clamped in the workpiece holders can be positioned by means of the rotational axis and can be machined in these workpiece holders by the tools clamped in the tool spindle.

SUMMARY

The objective of the invention is to develop a machine tool of the above type such that higher flexibility is achieved in regard to the tools to be used and workpieces to be machined.

This objective is achieved according to the invention by a machine tool as described herein.

Advantageous embodiments and developments of the invention are given in the subsidiary claims.

In the machine tool according to the invention, the magazine is configured with at least one magazine wheel, which can be positioned so as to rotate around a rotational axis. The magazine wheel has recesses that are arranged distributed around the magazine wheel in the circumferential direction. Recesses for tools and recesses for workpieces can be provided. Depending on the individual requirements for use, it is possible to provide only recesses for tools, only recess for workpieces or both recesses for tools and recesses for workpieces. A workpiece gripper, which can be moved in common with the tool spindle, is attached to the tool spindle so that the drive and the steering of the motion of the tool spindle are also simultaneously used to move the workpiece gripper. The tool spindle can travel to the magazine wheel in a controlled manner to exchange a tool between a recess of the magazine wheel and the tool spindle. This makes it possible to exchange different tools for different sequential machining operations or also to exchange tools for new tools in case of wear. Moreover, the workpieces to be machined can also be provided in the magazine; The same controlled, driven movements can move the workpiece gripper to a recess of the magazine wheel that accommodates a workpiece in order to remove the workpiece from the recess. The controlled movement in the linear axes makes it possible to transport the workpiece held in the workpiece gripper to the workpiece clamping mechanism and insert it in this mechanism. Conversely, the workpiece gripper can remove a workpiece clamped in the workpiece clamping mechanism and transfer it into the magazine. Workpieces stored in the magazine can thereby also be fed for machining, so that a larger number of identical workpieces or also different workpieces can be machined in succession.

The machine tool thus permits automatic exchange of the tools and/or workpieces. It is therefore possible to perform both different machining operations on uniform workpieces or identical or different machining operations on different workpieces in sequence with a high level of flexibility. This flexibility makes the machine tool especially suitable for the variable machining of small quantities.

Since the same controlled axes are used for the tool change, the workpiece change, the feed motion and the machining feed, the machine tool also distinguishes itself in particular through its inexpensive and space-saving design.

In one advantageous embodiment, the tool spindle can be moved on the Y-axis and the Z-axis, while the tool clamping mechanism performs the movement on the X-axis. This allows the tool spindle to be mounted symmetrically in the machine frame, making minimum thermal tolerances possible in particular. For this purpose, the tool spindle is advantageously arranged with its vertical Z-axis above the workpiece clamping mechanism that can travel on the machine bed on the X-axis.

The magazine wheel is arranged so as to rotate around a rotational axis parallel to the Z-axis, i.e. also vertical. It is possible to drive the tool spindle radially against the magazine wheel from outside in order to carry out a tool change or workpiece change. It is likewise possible to move the tool spindle so as to dip into the interior of the magazine wheel from above, especially to change tools that are lying in the recesses with their tool shank directed radially into the interior of the magazine wheel.

The magazine wheel can have a segmented relief. In this connection, no recesses are provided on the circumference of the magazine wheel in the area of this segmented relief. For a tool or workpiece change, the magazine wheel is positioned in such a rotational position that the recess of interest faces the tool spindle and the workspace. During the machining operation, the magazine wheel is positioned in such rotational position that the segmented relief faces the workspace and the workspace can thus mate with the magazine wheel. This makes it possible to arrange the rotational axis of the magazine wheel close to the workspace, thereby producing a space-saving design for the machine tool, especially with respect to the setup area.

The recesses for the tools should preferably be configured in a U-shape, so that the tools can be inserted into these recesses from above or removed upwards and can be held in the recesses solely by their weight. The same recesses can also be used for the workpieces if necessary, provided that these workpieces are provided with appropriate workpiece carriers that are adapted to fit the recesses.

For axially elongated workpieces, the magazine wheel can be provided with a plate into which the workpieces can be inserted in a radial fitting arrangement. Such a plate can be rigidly mounted on the magazine wheel and fill up the plate completely or sectorally. It is likewise possible to configure such a plate as a separate component, which can alternatively be placed on the magazine wheel when required.

The magazine can have one magazine wheel or be configured with two magazine wheels placed inside each another co-axially, wherein these two magazine wheels can be positioned into their rotational position around the same geometric rotational axis independently of each other.

In a structurally simple embodiment that also permits simple motion control, the workpiece gripper and tool spindle are arranged on a common carrier plate. This carrier plate can preferably travel on the Z-axis by means of a Z-carriage, wherein this Z-carriage is in turn mounted so as to travel on the Y-axis. The carrier plate can be rotated around the C-axis.

A particularly simple control results when the workpiece gripper is arranged axially aligned with the tool spindle. The positions of the workpiece gripper and tool spindle thereby differ only in the axial direction of the tool spindle. If the workpiece gripper is arranged axially in front of the tool spindle, then the workpiece gripper is preferably pivotable, so that the tool spindle is completely free for receiving a tool for machining or for tool change.

BRIEF DESCRIPTION OF THE DRAWINGS

The invention will be described in more detail below on the basis of an example of an embodiment illustrated in the diagram. The diagram shows.

DETAILED DESCRIPTION

Figure 1:
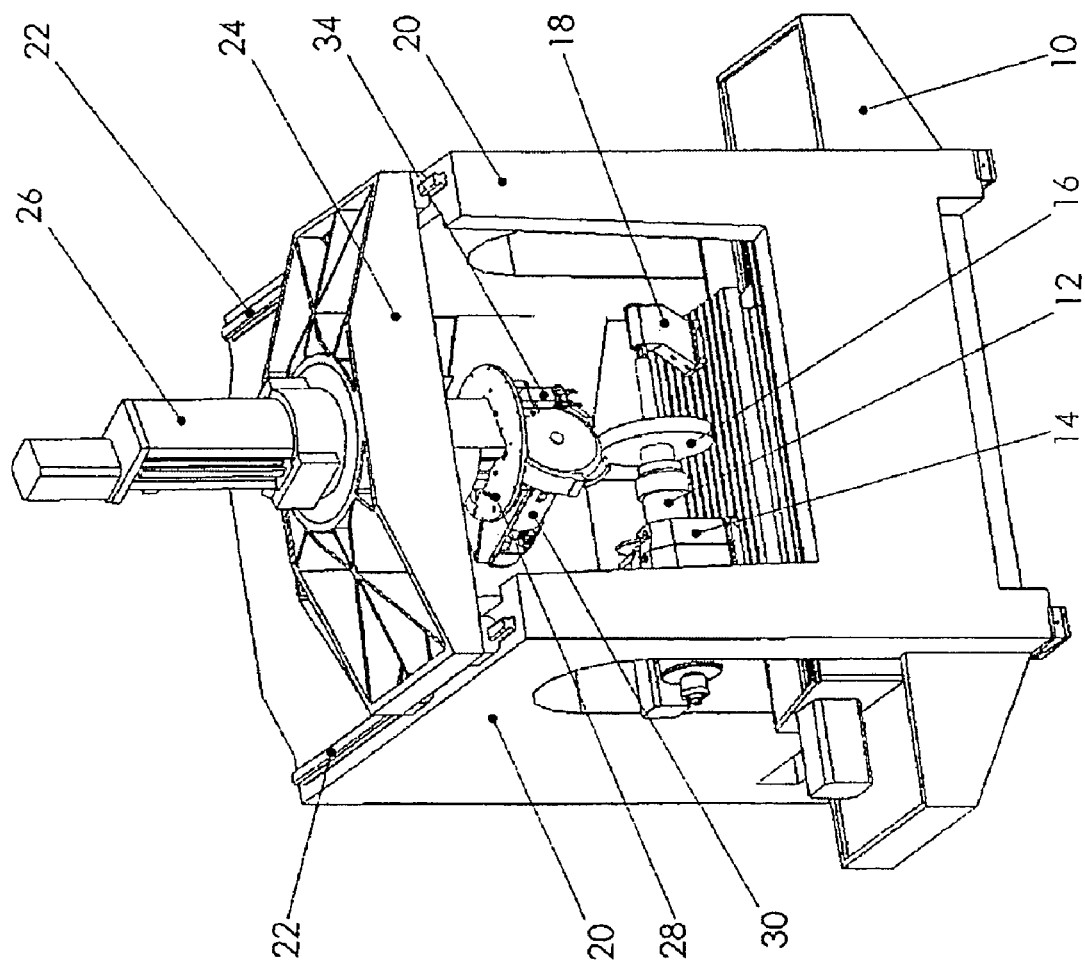
FIG. 1 a view of the machine tool.

In the embodiment depicted, the machine tool, in particular is shown as a grinding machine in which the tool spindle is loaded with grinding tools. It is obvious and can be seen from the following description that other tools, especially milling cutters and drilling tools if necessary, can also be used in the machine tool.

The machine tool has a machine frame with a horizontal machine bed 10 upon which a workpiece spindle 12 is mounted horizontally on the X-axis in a linearly mobile manner. The workpiece spindle 12 is arranged horizontally on the X-axis and can be driven to rotate by a workpiece-spindle drive 14. A workpiece 16, which is supported by a tailstock 18 if necessary, can be clamped to the workpiece spindle 12. One upwardly-directed side wall 20 of the machine frame is configured on each of the two sides of machine bed 10. On the top side of each of the side walls 20, these top sides being horizontal and running on the Y-axis, there is arranged a Y-guide 22. A bridge 24, which can travel linearly on the Y-axis in a controlled driven manner and which traverses the workspace of the machine tool between the side walls 20, is mounted on these Y-guides 22. A Z-carriage 26, which can travel linearly in the vertical Z-axis in a controlled driven manner and can be rotated around its vertical axis (C-axis) in a controlled driven manner, is mounted in the center of the bridge 24.

To this extent, the construction of the machine tool corresponds to the machine tool described in DE 10 2006 011 551 A1. Reference is made to the description there.

A carrier plate 28 is arranged on the bottom end of the Z-carriage 26. A tool spindle 30 that can be rotationally driven is mounted on this carrier plate 28. The tool spindle 30 is arranged on the carrier plate 28 so as to have a horizontal axis. The tool spindle 30 can receive and clamp a tool, for which purpose the tool spindle 30 is configured, for example with a taper shank recess. The fitting arrangement of the tool spindle 30 on the carrier plate 28 is chosen so that a tool clamped to the tool spindle 30 lies in the C-axis around which the tool spindle 30 can be pivoted. If necessary, the tool spindle 30 can also be arranged on the carrier plate 28 so that it can also travel in a linear fashion, the linear travel running in the axis of the tool spindle 30. It is likewise also possible to mount the tool spindle 30 so as to pivot on the carrier plate 28 such that the axis of the tool spindle 30 can pivot out of the horizontal position and make an inclination angle relative to the plane of the carrier plate 28.

The motion of the workpiece 16 on the X-axis, the motion of the bridge 24 on the Y-axis and the motion of the Z-carriage 26 on the Z-axis make it possible to realize the three linear main axes for the machining of the workpiece 16. The pivoting of the tool spindle 30 around the C-axis and, if necessary, an adjustment of the inclination of the tool spindle 30 relative to the carrier plate 28 make it possible to adjust, in a controlled manner, the setting angle of the tool, e.g. a grinding wheel, relative to the workpiece 16 to be machined.

Figure 2:
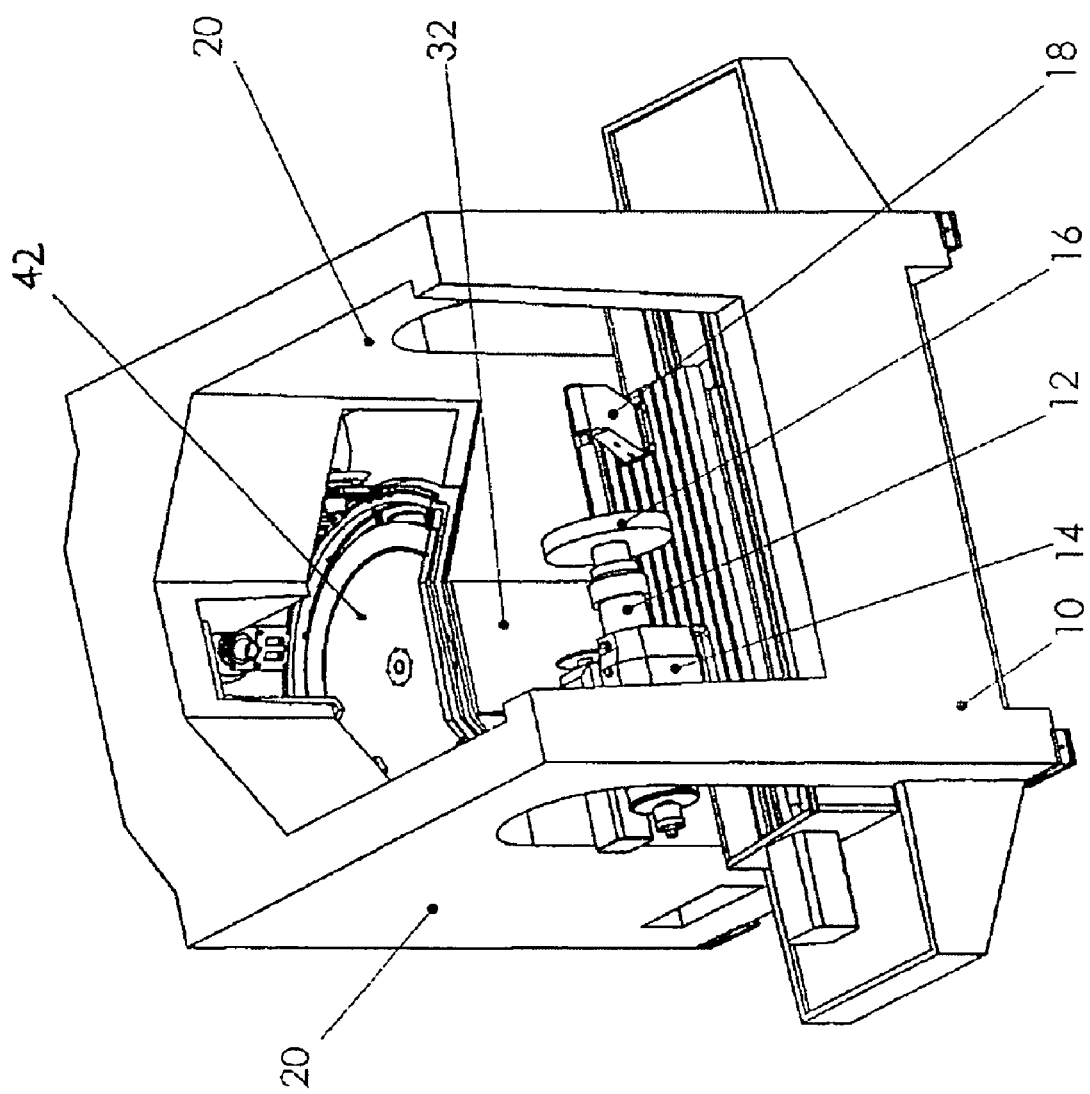
FIG. 2 a corresponding view of the machine tool, wherein the tool spindle and the parts supporting it have been removed and the magazine is situated in the rest position, FIG. 3 an illustration corresponding to FIG. 2, wherein the magazine wheel is in the change position, FIG. 4 a detailed illustration of the magazine wheel and the tool spindle, FIG. 5 a side view of the magazine wheel and the tool spindle before the tool change, FIG. 6 an illustration corresponding to FIG. 5 during tool change, FIG. 7 a perspective illustration of the magazine wheel and the tool spindle during the course of the tool change, FIG. 8 a perspective view of the machine tool while a workpiece is being changed on the workpiece spindle, FIG. 9 a side view of the magazine wheel during the change of one workpiece, FIG. 10 a perspective view of a magazine with an external and an internal magazine wheel, FIG. 11 a top view of the magazine of FIG. 10, and FIG. 12 a perspective view of another embodiment of the magazine for receiving elongated workpieces.

In the representation of FIG. 1, the tool spindle 30 is situated in the work position in which a tool, e.g. a grinding wheel, clamped to the tool spindle 30 machines the workpiece 16. In FIG. 2, the bridge 24 and the Z-carriage 26 with the tool spindle 30 are removed for better visibility. It is evident that the workspace on the back side facing away from the operator side (the front side in the diagram) curves toward the rear, e.g. in the shape of a polygon, to permit the pivot motion of the horizontal tool spindle 30 around the vertical C-axis. Dividing walls 32, which can be moved away, seal off the rear side of the workspace. A magazine, which will be described later, is situated behind these dividing walls 32.

Figure 4:
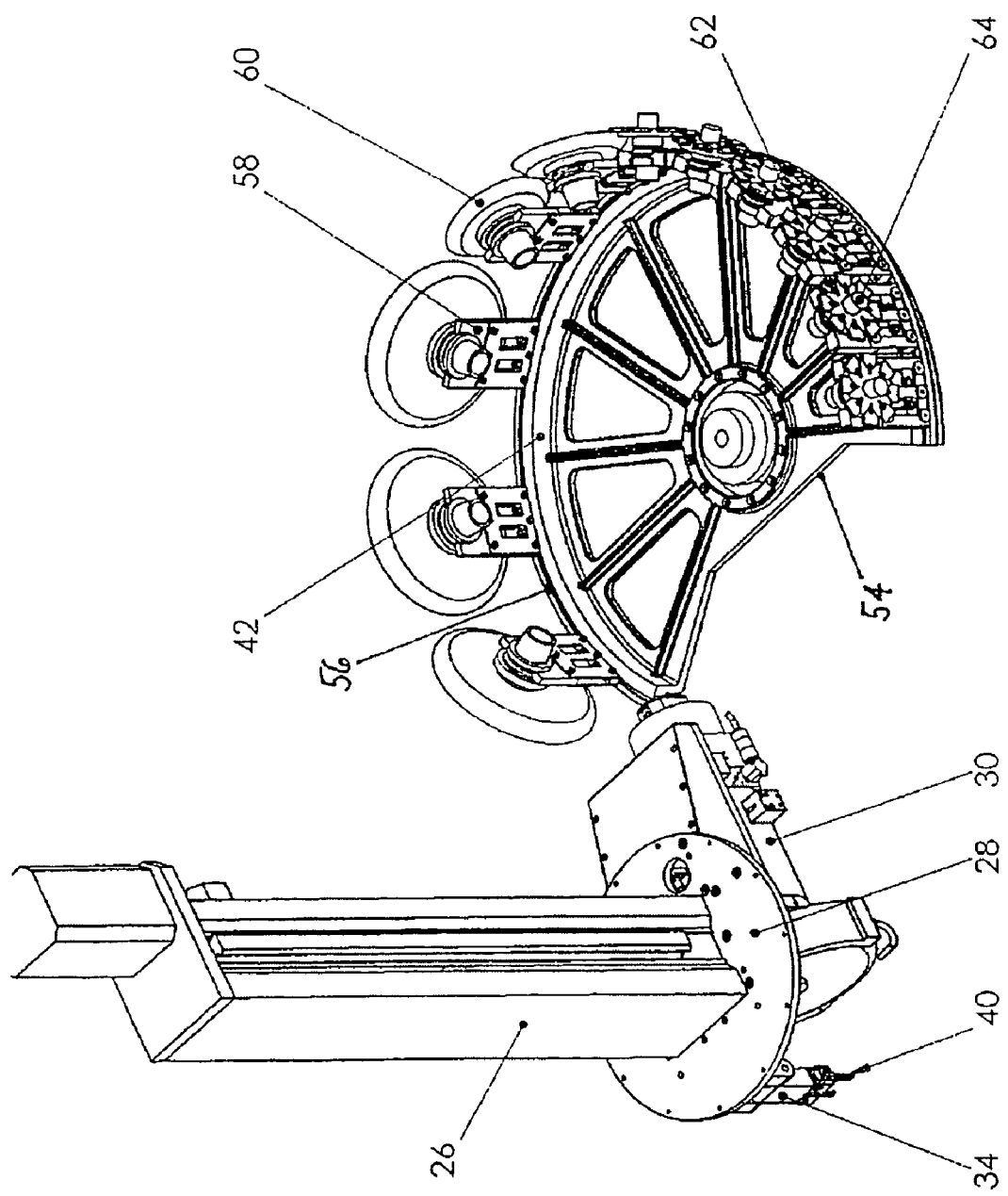
Figure 5:
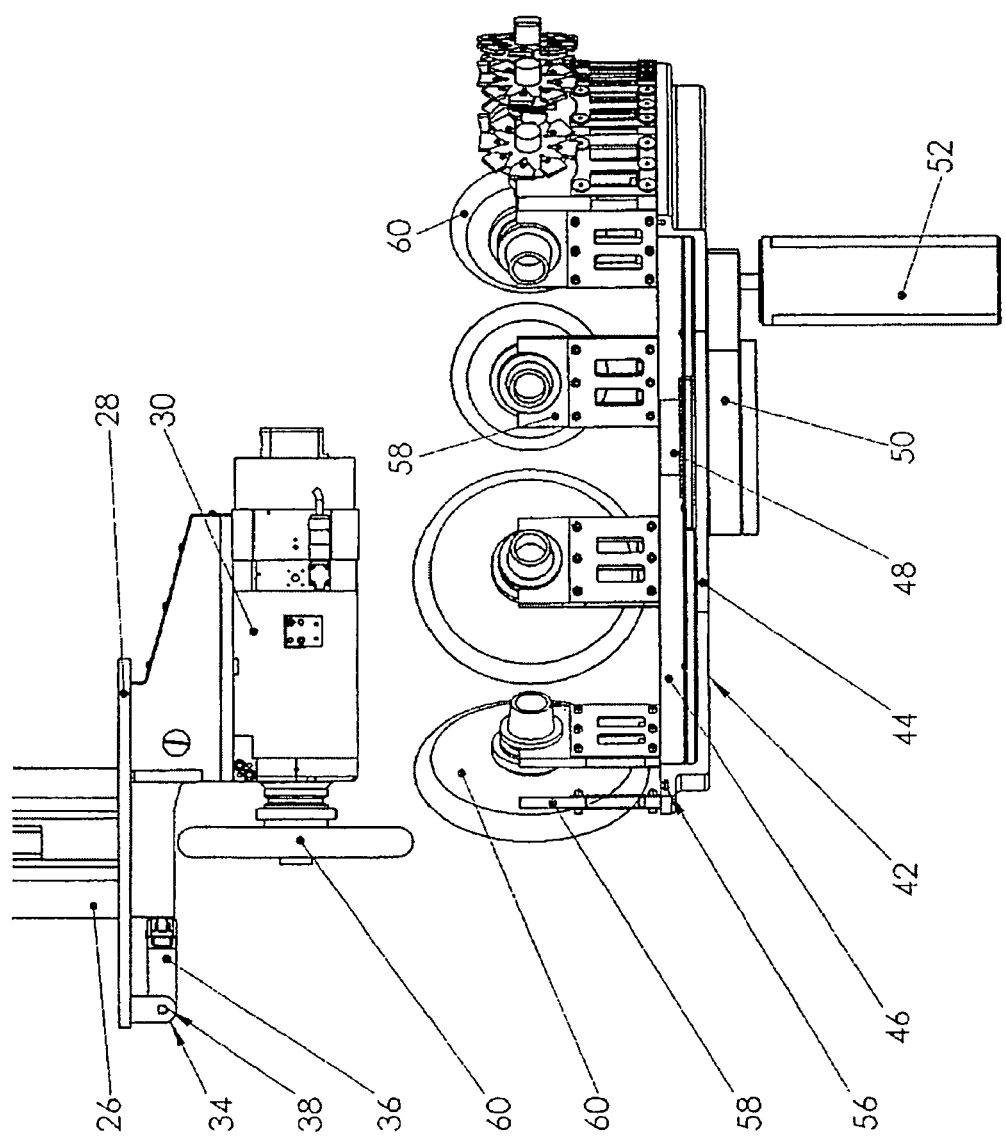

As is particularly evident in FIGS. 4 and 5, a workpiece gripper 34 is also attached to the bottom of the carrier plate 28 in addition to the tool spindle 30. The workpiece gripper 34, which is controlled in common with the tool spindle 30 by the same drive, can thus travel linearly on the Y-axis and the Z-axis and pivot around the C-axis. The workpiece gripper 34 is arranged on the carrier plate 28 diametrically opposite the tool spindle 30 in relation to the C-axis. The workpiece gripper 34 has an arm 36, which is arranged with a joint, so as to pivot on the carrier plate 28. Gripper fingers 40, which are designed in a tooth-like manner, are arranged on the open end of the arm 36. The workpiece gripper 34 can be pivoted upwards around the joint 38, so that the arm 36 having the gripper fingers 40 rests against the bottom of the carrier plate 28. In this rest position, the workpiece gripper 34 has no function and releases the space in front of the tool spindle 30, so that a tool can be inserted into the tool spindle 30 and this tool can machine the workpiece 16. If the workpiece gripper 34 is pivoted downwards out of this rest position, then the arm 36 projects vertically downwards from the carrier plate 28, and the gripper fingers 40 are axially aligned in front of the clamping recess of the tool spindle 30.

In one simple embodiment, the magazine arranged behind the dividing walls 32 has a magazine wheel 42, which can be driven in a controlled manner so as to rotate around a vertical axis parallel to the Z-axis and be positioned in its rotational position. The magazine wheel 42 consists of a circular magazine disk 44, which lies in the horizontal plane and on the outside circumference of which there is arranged a magazine ring 46 pointing vertically upwards. The magazine disk 44 can be configured as a closed disk, but is preferably configured as a spoked disk. The magazine disk 44 is centrally seated on a vertical drive shaft 48, which can be driven underneath the magazine disk 44 by an NC-controlled motor 52 using a toothed belt 50.

Figure 3:
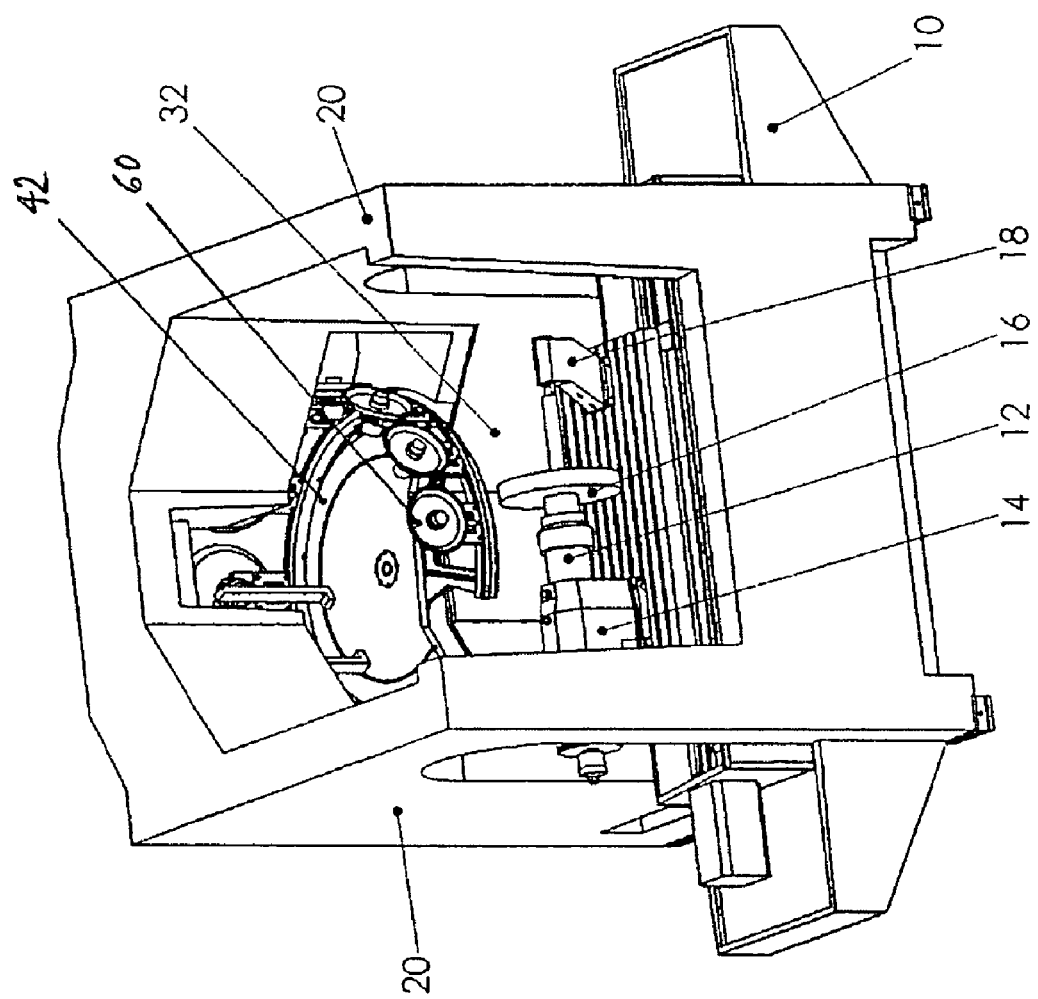

The magazine disk 44, and consequently the entire magazine wheel 42, is configured in an angle range with a segmented relief 54. The shape of this segmented relief 54 corresponds to the polygonal shape of the dividing walls 32. If the rotational position of the magazine wheel 42 is positioned so that the segmented relief 54 faces the workspace, then it is possible to move the dividing walls 32 within this segmented relief 54 into the closed position. If the dividing walls 32 have returned to their open position, then the magazine wheel 42 can be rotated around its vertical axis and its circumference extends into the workspace of the machine tool. FIGS. 2 and 3 show these two positions. The configuration of the magazine wheel 42 with the segmented relief 54 makes it possible to arrange drive shaft 48 structurally near the workspace, which curves toward the rear, so that the magazine does not significantly enlarge the base of the machine tool.

The top edge of the magazine ring 46 incorporates a T-groove 56, which coaxially surrounds this magazine ring 46. Recesses 58, which engage the T-groove 56 with a foot, are inserted in this T-groove 56. This foot allows the recesses 58 in the T-groove 56 to be shifted in the circumferential direction of the magazine ring 46 and be clamped into the desired position. The recesses 58 project vertically upwards from the magazine ring 46 and open upwards U-shaped. The recesses 58 serve to receive tools or workpieces. The recesses 58 are configured to correspond to the tools or workpieces to be magazined. For example, the diagram shows tools 60 in the form of grinding wheels that have a standardized taper shank for clamping a hollow-shank-taper tool in the workpiece spindle 12. In this case, the recesses 58 are configured so that the tool 60 can be inserted into the recess 58 from above, the recess 58 engaging the;engagement groove of the taper shank. The tool 60 is held in the recess 58 by its own weight, secure against centrifugal forces and tilting moments without additional fasting and locking. The tools 60 are inserted into the recesses 58 such that the magazine ring 46 directs their taper shanks radially inwards, while the actual tool is directed radially outwards. Since the diameter of the actual tool is larger as a rule than the diameter of the taper shank, this results in optimum space utilization on the magazine circumference. It is possible to shift the recesses 58 in the T-groove 56 in the circumferential direction of the magazine ring 46 and to arrange them at a mutual angular distance such that an optimum utilization of the circumference of the magazine wheel 42 corresponding to the diameter of the respective tool 60 is achieved.

As an alternative to the tools 60, workpieces to be machined that are supposed to be machined one after the other can also be stored in the magazine wheel 42. The magazined workpieces are likewise held and provided in the recesses of the magazine wheel 42. The shape and design of the recesses are adapted to fit the workpieces to be magazined such that it is possible to insert the workpieces into these recesses, remove them from these recesses and hold them in these recesses. Depending on the demand for the use of the machine tool, it is possible to arrange only recesses for tools, only recesses for workpieces or recesses both for tools and workpieces in the magazine wheel 42. The recesses for tools and/or workpieces are positioned and wedged and fixed in the T-groove 56 in the circumferential direction in an optimized manner. The positions of the recesses for the tools and/or workpieces are stored as angular-position values in the controller of the motor 52, so that the magazine wheel 42 can be positioned into the appropriate angular position corresponding to a requirement.

In a special embodiment example, the recesses for the workpieces can coincide with the recesses 58 for the tools 60, as shown in FIGS. 4 to 7. In this case, the workpieces to be machined are cutter edges 62, which are fastened to a workpiece carrier 64. The workpiece carrier 64 has the shape of a standardized taper shank that corresponds to the taper shank of the tool 60. In this manner, it is possible to insert the workpiece carriers with the cutter edges 62 into the same recesses 58 used for the receiving the tools 60.

During the machining of a workpiece 16 by a tool 60, the machine tool will be situated in the position shown in FIG. 2 in which the segmented relief 54 of the magazine wheel 42 coincides with the position of the dividing walls 32 and these are closed. The dividing walls 32 shield the magazine wheel 42 from the workspace. This corresponds to the representation of FIG. 4, in which only the Z-carriage and the magazine wheel are illustrated. To carry out a tool change, the dividing walls 32 are withdrawn so that the magazine wheel 42 can be rotated into the workspace. The magazine wheel 42 is rotated and positioned in a controlled manner such that an open recess 58 is brought into a change position in the workspace. The tool spindle 30 is raised by means of the Z-carriage 26 and moved over the magazine wheel 42 on the Y-axis by means of the bridge 24. This position is shown in FIG. 5. The Z-carriage 26 is then driven downwards so that the tool 60 clamped to the tool spindle 30 is inserted into the open recess 58 (FIG. 6).

Figure 7:
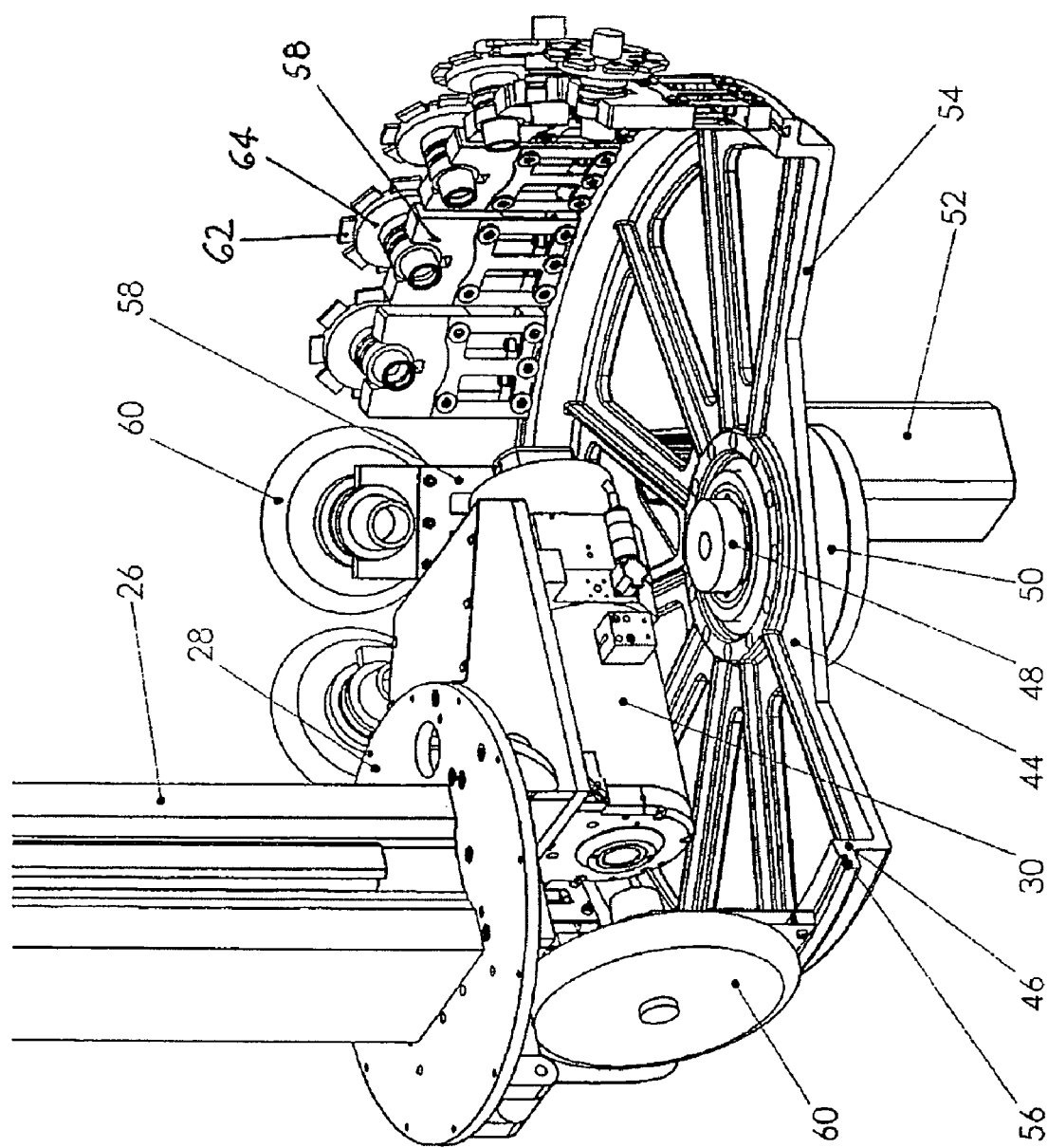

After the clamping mechanism of the tool spindle 30 has been loosened, the tool spindle is moved from the tool 60 on the Y-axis radially inwards with respect to the magazine wheel 42, so that the tool spindle 30 releases the tool 60 now lying in the recess 58 (FIG. 7). The magazine wheel 42 can now be rotated in a controlled manner until a new substitute tool 60 is positioned in front of the tool spindle 30. The tool spindle 30 is now moved radially outwards, again with respect to the magazine wheel 42, in reverse order so that the clamping mechanism of the tool spindle 30 is pushed over the taper shank of the tool 60 now to be received and this tool 60 can be clamped. Next, the Z-carriage 26 is again driven upwards so that the now clamped tool 60 is lifted out of the recess 58. By means of the bridge 24, the tool spindle 30 is then moved on the X-axis back into the workspace. The magazine wheel 42 is then rotated so that the segmented relief 54 again faces the workspace and the dividing walls 32 can be closed. The machine tool is now ready to machine a workpiece with the tool 60 that has now been substituted in.

Figure 6:
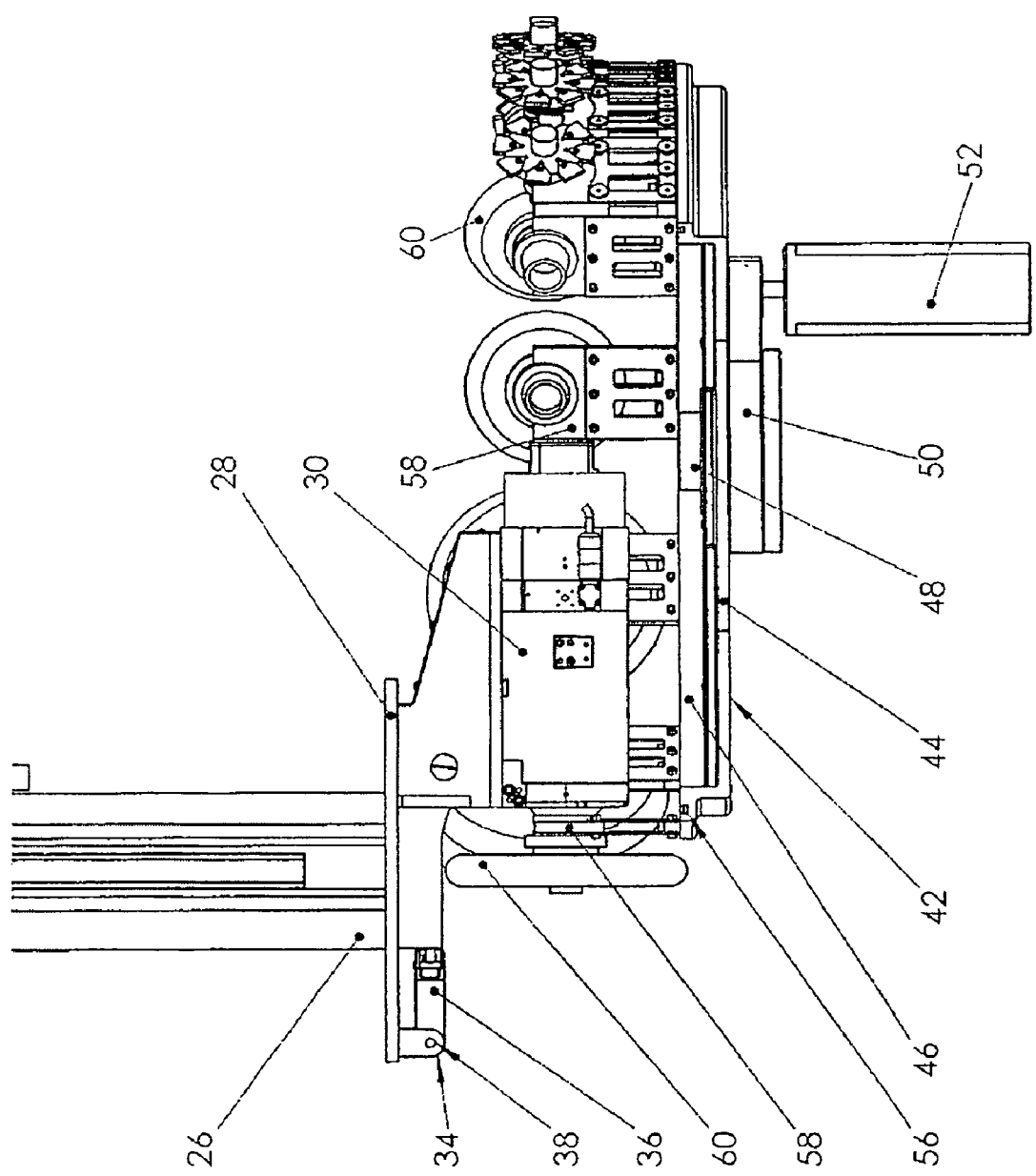

During the machining and during the entire tool-change process, the workpiece gripper 34 is located in the rest position, pivoted upwards and adjacent to the carrier plate 28, as clearly shown in FIGS. 5 and 6 in particular.

Figure 8:
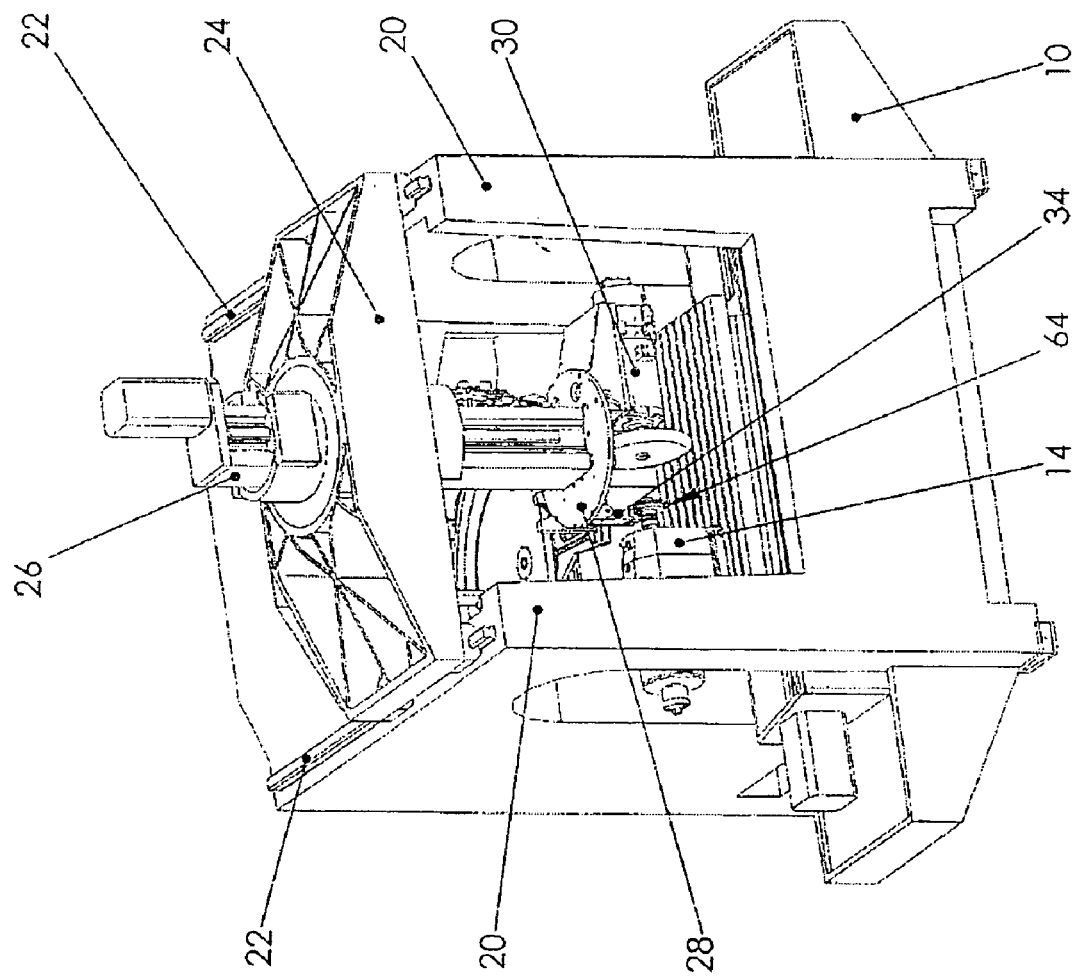
Figure 9:
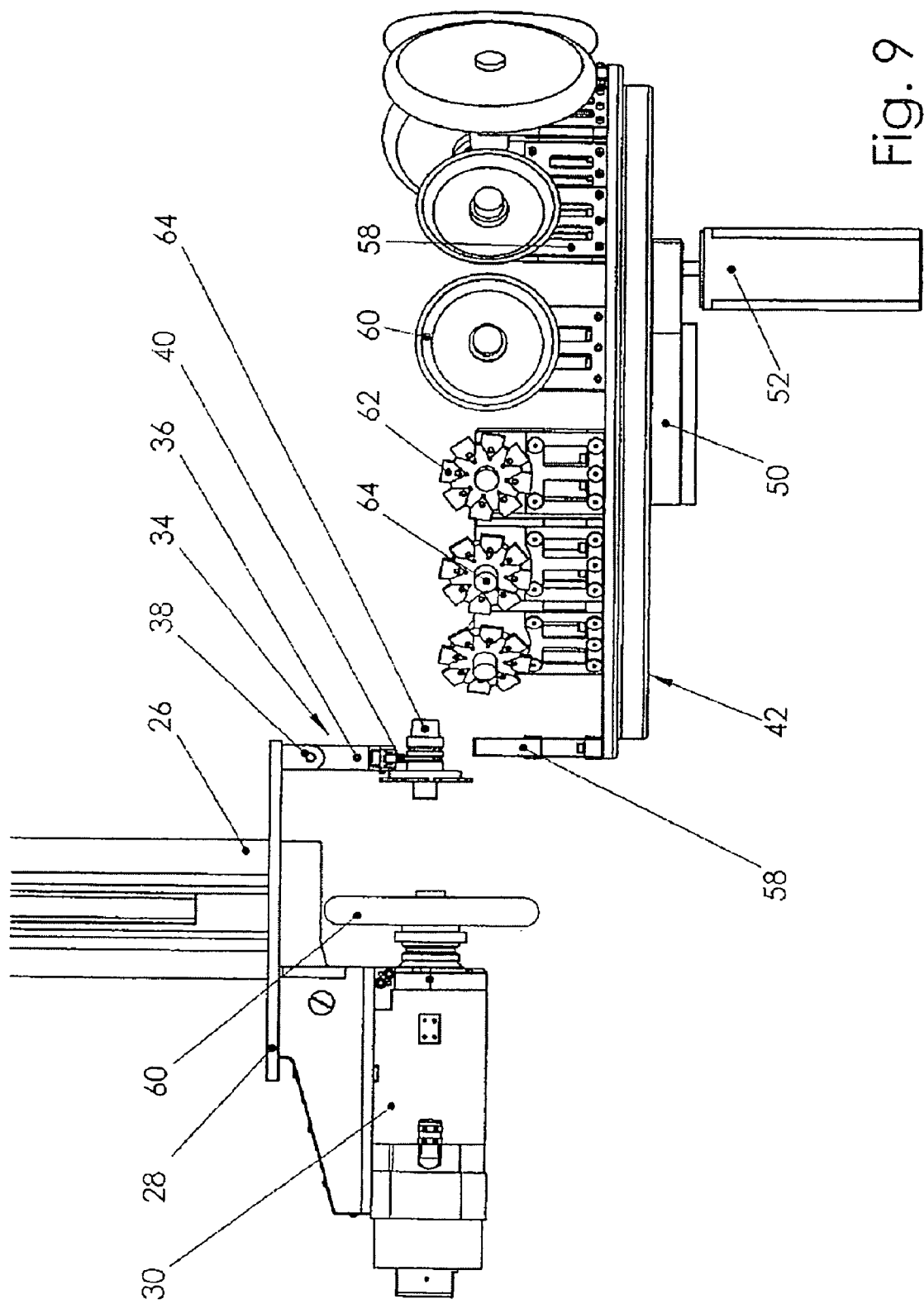

If a workpiece to be machined is exchanged, then, preferably after the tool has been deposited in the magazine, the workpiece gripper 34 is pivoted downwards out of its rest position, as shown in FIG. 9 for example. The workpiece gripper 34 is positioned over a workpiece carrier 64 clamped in the workpiece spindle 12 by moving the bridge 24 on the Y-axis and by moving the workpiece spindle 12 on the Y-axis (FIG. 8). The workpiece gripper 34 is then lowered vertically using the Z-carriage 26 so that the gripper fingers 40 can engage the workpiece carrier 64 clamped in the workpiece spindle 12. When the workpiece gripper 34 has detected the workpiece carrier 64, the clamping of the workpiece carrier 64 to the workpiece spindle 12 is released and the workpiece spindle 12 is returned on the X-axis so that the workpiece carrier 64 is released from the workpiece spindle 12. At the same time, the dividing walls 32 are returned and the magazine wheel 42 is rotated in the workspace and positioned such that an open recess 58 for the workpiece is situated in the change position. The workpiece gripper 34 is moved with the workpiece carrier 64 on the Z-axis and Y-axis over the open recess 58 (FIG. 9), whereupon the workpiece carrier 64 can be inserted into the open recess 58 by lowering the Z-carriage 26. The workpiece gripper 34 is then again lifted on the Z-axis and a workpiece carrier 64 to be substituted-in is positioned below the workpiece gripper 34 by rotating the magazine wheel 42. The workpiece gripper 34 is now lowered by means of the Z-carriage 26 in order to get hold of the new workpiece carrier. The tool carrier to be substituted-in is then positioned axially in front of the workpiece spindle 12 by moving the workpiece gripper 34 on the Z axis and on the Y-axis and by pivoting around the C-axis. The workpiece spindle 12 is then moved on the X-axis against the workpiece carrier, so that the latter can be inserted into the clamping mechanism of the workpiece spindle 12.

The workpiece gripper 34 is then pivoted up back into its rest position, so that a tool 60 can be clamped to the tool spindle 30 or the workpiece gripper 34 can freely insert a tool clamped there for machining.

Figure 10:
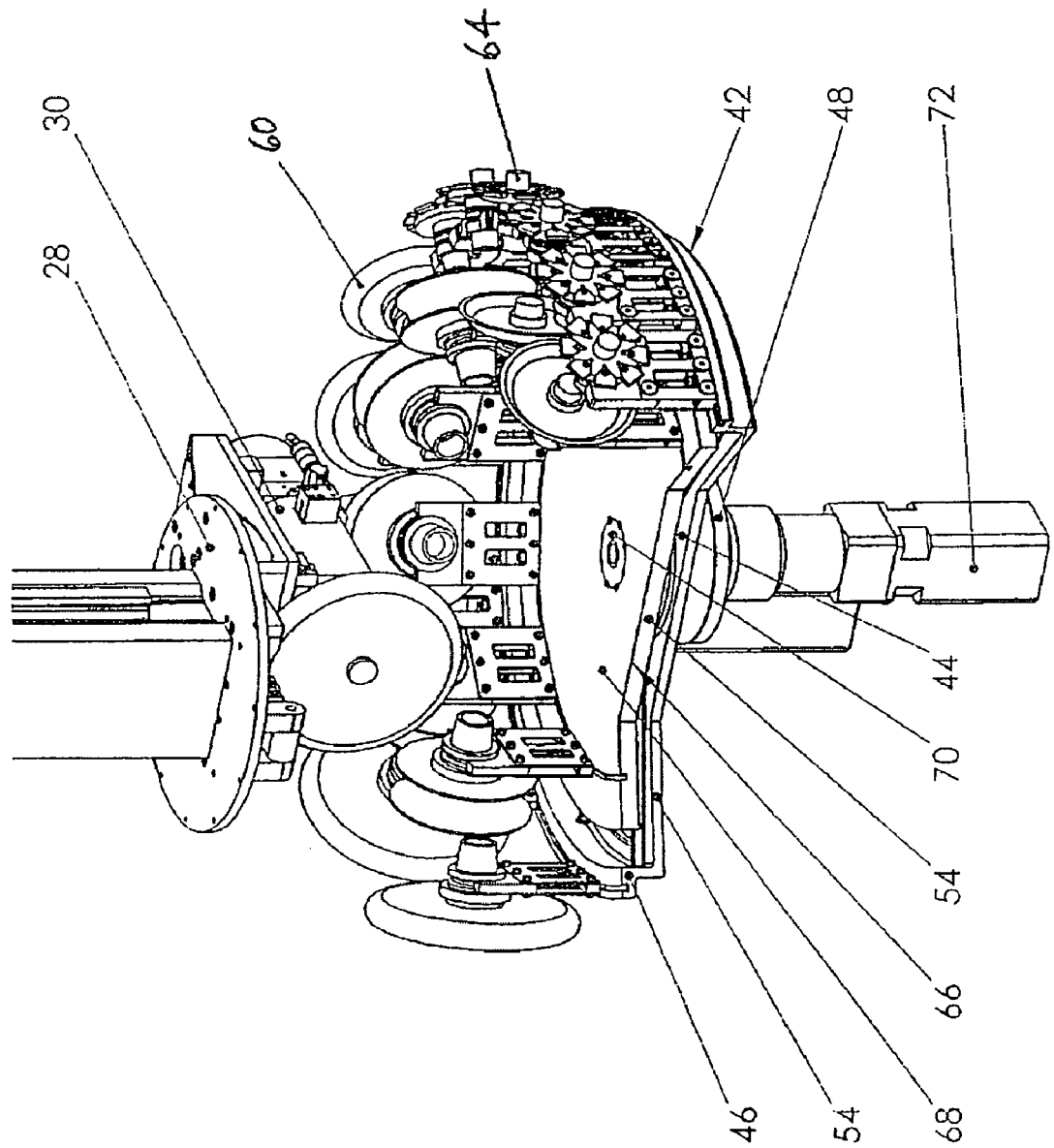
Figure 11:
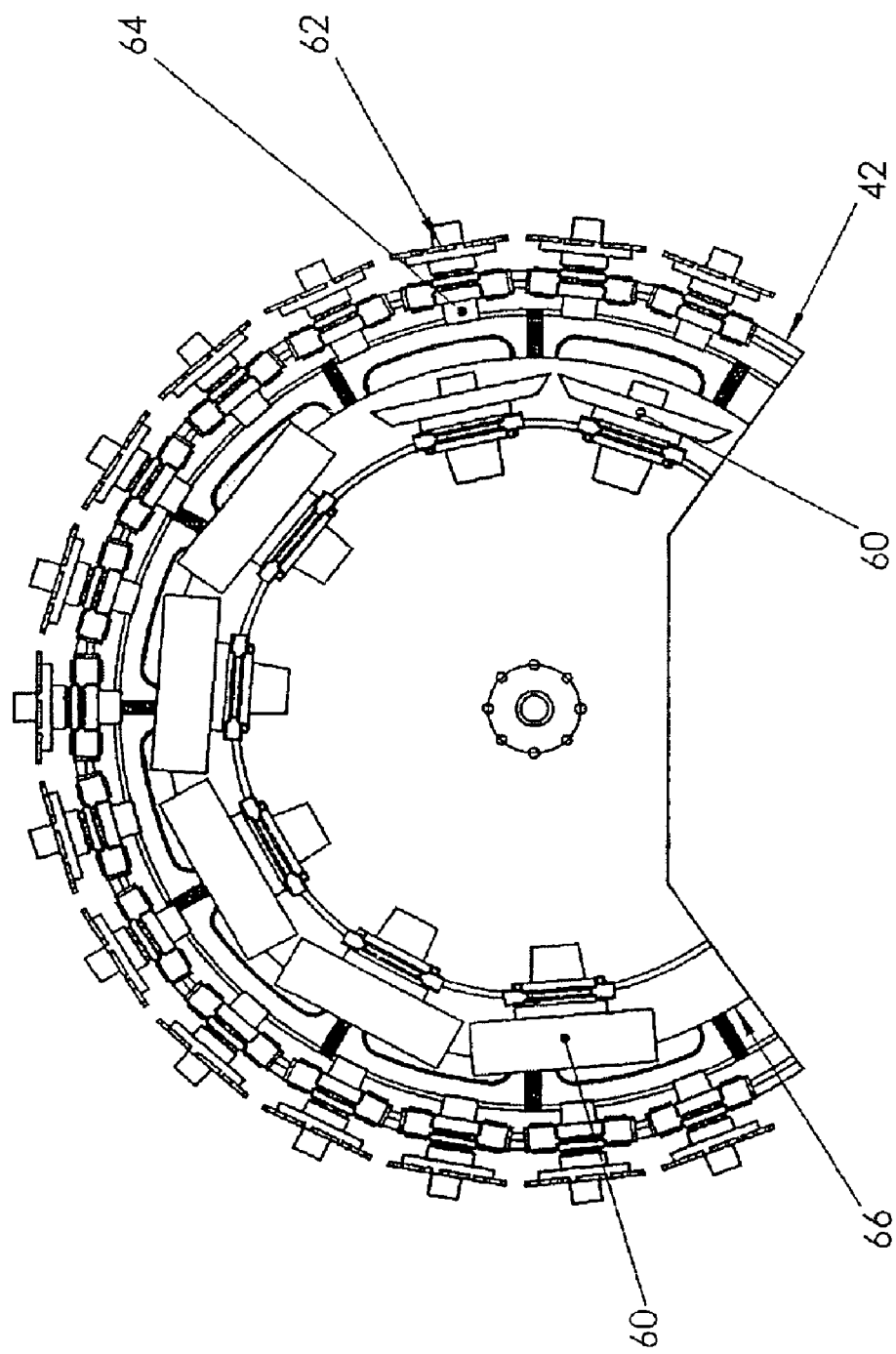

FIGS. 4 to 7, the magazine is depicted with only one magazine wheel 42. In another embodiment, which is represented in FIGS. 10 and 11, the magazine has a second internal magazine wheel 66 in addition to the first external magazine wheel 42.

The internal magazine wheel 66 is arranged coaxially to the external magazine wheel 42 and has a magazine disk 68, which is arranged concentrically and parallel to the magazine disk 44 of the external magazine wheel 42. The outside diameter of the magazine disk 68 is smaller than the inside diameter of the magazine ring 46 of the external magazine wheel 42. The internal magazine wheel 66 can be rotated freely and independently of the external magazine wheel 42. For this purpose, the magazine disk 68 of the internal magazine wheel 66 has a vertical central drive shaft 70, which is mounted so as to rotate coaxially within the drive shaft 48 of the external magazine wheel 42, this latter drive shaft 48 being configured as a hollow shaft. An NC-controlled motor 72 arranged beneath the external magazine wheel 42 can drive the internal magazine wheel 66 through its drive shaft 70 independently of the external magazine wheel 42.

The internal magazine wheel 66 is essentially designed in a manner corresponding to the external magazine wheel 42. A magazine ring, within which recesses can be arranged in an adjustable manner and wedged into their angular position, runs concentrically on the top of the magazine disk 68. The magazine ring and the recesses can be designed in a manner corresponding to that described above for the external magazine wheel 42. The magazine ring having the recesses is designed with a smaller radius, however, so that a radial clearance, which is required for receiving the tools or workpieces stored in the internal magazine wheel 66, remains open between the magazine ring of the internal magazine wheel 66 and the magazine ring 46 of the external magazine wheel 42.

The removal and delivery of tools 60 or workpieces 64 into the internal magazine wheel 66 is performed in the same manner as described above for the external magazine wheel 42. The internal magazine wheel 66 likewise has a segmented relief 54, which is congruent to the segmented relief 54 of the external magazine wheel 42 when the external magazine wheel 42 and the internal magazine wheel 66 are in angular alignment. In particular, the magazine ring of the internal magazine wheel 66 also has a corresponding angular cutout so that the tools 60 in the external magazine wheel 42 are freely accessible to the tool spindle 30 in the manner described above through this cutout in the magazine ring of the internal magazine wheel 66.

The independently controlled adjustability of the rotational positions of the external magazine wheel 42 and the internal magazine wheel 66 enables them to be brought into the change position independently of one another and enables the tools 60 and/or workpieces to be exchanged into and out of the external magazine wheel 42 or the internal magazine wheel 66 in any programmable manner. The internal magazine wheel 66 thus increases the number of storage places in the magazine for tools and/or workpieces without increasing the external dimensions of the magazine.

In the example embodiment of FIG. 10, for example, some cutter edges 62 on workpiece carriers 64 and some tools 60 are magazined in the external magazine wheel 42, whereas tools 60 in the form of grinding wheels are magazined in the internal magazine wheel 66. In FIG. 11, the external magazine wheel 42 contains only workpieces 62, 64 and the internal magazine wheel 66 contains only tools 60.

FIG. 12 depicts another embodiment of the recesses of the magazine, wherein this embodiment is suited for axially elongated workpieces, e.g. for magazining drill bits to be ground.

In this embodiment, a plate 74, which is rigidly or detachably connected to the magazine wheel 42, is placed on this magazine wheel 42. In the circumferential direction, the plate 74 can extend across the entire angle area of the magazine wheel 42, i.e. cover the magazine disk 44 up to the segmented relief 54, as illustrated in the diagram. But the plate 74 can likewise also extend only across a limited angle area, so that the remaining angle area of the magazine wheel 42 remains open for recesses 58 for tools 60. Radially extending grooves 76, which are configured as recesses into which the workpieces 78, e.g. drill bits to be ground, can be inserted, are disposed on the top of the plate 74.

The removal and deposit of workpieces 78 by the workpiece ripper 34 and the substituting of the workpieces 78 into the workpiece spindle 12 proceeds in the manner described above.

List of Reference Numbers 10 machine bed
12 workpiece spindle
14 workpiece-spindle drive
16 workpiece 18 tailstock
20 side wall
22 Y-guide
24 bridge
26 Z-carriage
28 carrier plate
30 tool spindle
32 dividing walls
34 workpiece gripper
36 arm
38 joint
40 gripper fingers
42 magazine wheel
44 magazine disk
46 magazine ring
48 drive shaft
50 toothed belt
52 motor
54 segmented relief
56 T-groove
58 recesses
60 tools
62 cutter edges
64 workpiece carrier
66 internal magazine wheel
68 magazine disk
70 drive shaft
72 motor
74 plate
76 grooves
78 workpieces

The invention claimed is:

1. A machine tool comprising a machine frame (10, 20), a tool spindle (30) that can be driven so as to rotate, a workpiece clamping mechanism (12) and a magazine, wherein the tool spindle (30) and the workpiece clamping mechanism (12) can be moved relative to one another on a linear X-axis in a controlled manner, and wherein the tool spindle (30) can be moved in a controlled manner in relation to machine frame (10, 20) on Y- and Z-axes which are perpendicular to the X-axis and to each other and can be pivoted in a controlled manner around a C-axis parallel to the Z-axis, characterized in that the magazine has at least one magazine wheel (42, 66) which can be positioned rotating around a rotational axis parallel to the Z-axis, that the magazine wheel (42, 66) has recesses (58, 76) for tools (60) and/or workpieces (62, 64, 78) arranged distributed in its circumferential direction, that a workpiece gripper (34), which can be moved in common with the tool spindle (30), is assigned to the tool spindle (30), and that the tool spindle (30) can travel with the workpiece gripper (34) to the magazine wheel (42, 66) on the Y, Z and C-axes and can be aligned in relation to the recesses (58, 76) so that either a tool (60) can be exchanged between the tool spindle (30) and a recess (58) of the magazine wheel (42, 66) or a workpiece (62, 64, 78) can be exchanged between the workpiece gripper (34) and a recess (58, 76) of the magazine wheel (42, 66), wherein the movements on the X, Y, Z and C axes effect a transfer of the workpiece (16, 62, 64, 78) between the workpiece gripper (34) and the workpiece clamping mechanism (12).

2. The machine tool according to claim 1, characterized in that the Z-axis is arranged vertically and the at least one magazine wheel (42, 66) rotates around a vertical rotational axis.

3. The machine tool according to claim 2, characterized in that the at least one magazine wheel (42, 66) has a segmented relief (54), which is assigned to the workspace of the machine tool during the machining operation.

4. The machine tool according to claim 1, characterized in that the magazine has an external magazine wheel (42) and an internal magazine wheel (66) arranged coaxially therein, wherein the magazine wheels (42 and 66) can be positioned in a controlled manner independently of each other so as to rotate.

5. The machine tool according to claim 1, characterized in that the tools (60) in the at least one magazine wheel (42, 66) are received with tool shank directed radially inwards with respect to the magazine wheel (42, 66) and that the tool spindle (30) dips into the interior of the at least one magazine wheel (42, 66) and can be moved radially against the recesses (58) within the interior of the magazine wheel (42, 66) for a tool change.

6. The machine tool according to claim 1, characterized in that the tool spindle can be moved on the Y and the Z-axis and the workpiece clamping mechanism (12) can be moved on the X-axis.

7. The machine tool according to claim 1, characterized in that the tool spindle (30) and the workpiece gripper (34) are mounted on a common carrier plate (28).

8. The machine tool according to claim 7, characterized in that the carrier plate (28) is attached to a Z-carriage 26) which can be moved on the Z-axis and rotated around the C-axis.

9. The machine tool according to claim 7, characterized in that the workpiece gripper (34) is mounted on the carrier plate (28) so as to pivot between a rest position and an operating position, wherein the workpiece gripper (34) is situated axially aligned in front of the tool spindle (30) in its operating position and is pivoted out of the area in front of the tool spindle (30) in its rest position.

10. The machine tool according to claim 1, characterized in that the workpieces (62) are attached to workpiece carriers (64), which can be inserted into recesses (58) that coincide with the recesses (58) for the tools (60).

11. The machine tool according to claim 1, characterized in that the magazine wheel (42) has a plate (74), which has radial grooves (56) as recesses for axially elongated workpieces (78).

* * * * *